(12) United States Patent
Hauck

(10) Patent No.: US 10,788,106 B2
(45) Date of Patent: Sep. 29, 2020

(54) CLEARANCE-FREE SELF-ALIGNING BEARING ON THE DECOUPLING TENSIONER

(71) Applicant: Schaeffler Technologies AG & Co. KG, Herzogenaurach (DE)

(72) Inventor: Christian Hauck, Altdorf (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 264 days.

(21) Appl. No.: 15/768,228

(22) PCT Filed: Nov. 8, 2016

(86) PCT No.: PCT/DE2016/200501
§ 371 (c)(1),
(2) Date: Apr. 13, 2018

(87) PCT Pub. No.: WO2017/080551
PCT Pub. Date: May 18, 2017

(65) Prior Publication Data
US 2018/0320765 A1 Nov. 8, 2018

(30) Foreign Application Priority Data
Nov. 11, 2015 (DE) .......................... 10 2015 222 203

(51) Int. Cl.
*F16H 7/12* (2006.01)
*F02B 67/06* (2006.01)
*F16H 7/08* (2006.01)

(52) U.S. Cl.
CPC ........... *F16H 7/1281* (2013.01); *F02B 67/06* (2013.01); *F16H 7/1218* (2013.01);
(Continued)

(58) Field of Classification Search
CPC ............. F16H 2007/081; F16H 7/1281; F16H 2007/0893; F16H 7/1218; F16H 2007/0874
(Continued)

(56) References Cited

U.S. PATENT DOCUMENTS 5,620,385 A * 4/1997 Cascionale ........... F16H 7/1218
474/112
6,648,783 B1 * 11/2003 Bogner ................. F16H 7/1281
474/134
(Continued)

FOREIGN PATENT DOCUMENTS

DE  102009020589  11/2010
DE  102011084680  11/2012
(Continued)

*Primary Examiner* — Henry Y Liu
(74) *Attorney, Agent, or Firm* — Volpe and Koenig, P.C.

(57) ABSTRACT

A self-aligning tensioner (1) for an endless traction mechanism drive in an internal combustion engine is provided, including a base unit (2) and a separate annular tensioning arm (3), the tensioning arm (3) being slidably mounted in a sliding bearing area (4) of the base unit (2) in order to allow a rotational movement relative to the base unit (2); at least one spring element (5, 6) that tensions the base unit (2) and the tensioning arm (3) against each other is inserted between the sliding bearing area (4) of the base unit (2) and the tensioning arm (3).

16 Claims, 4 Drawing Sheets

(52) U.S. Cl.
CPC .............. *F16H 2007/0806* (2013.01); *F16H 2007/0874* (2013.01); *F16H 2007/0893* (2013.01)

(58) Field of Classification Search
USPC .................................................. 474/135, 134
See application file for complete search history.

(56) References Cited

U.S. PATENT DOCUMENTS

| | | | | |
|---|---|---|---|---|
| 6,932,731 | B2* | 8/2005 | Kaiser | F16H 7/1218 |
| | | | | 474/112 |
| 7,637,829 | B2* | 12/2009 | Stone | F16H 7/1281 |
| | | | | 474/109 |
| 7,699,732 | B2* | 4/2010 | Message | F16H 7/1281 |
| | | | | 474/106 |
| 7,918,755 | B2* | 4/2011 | Baumuller | F16H 7/1281 |
| | | | | 474/112 |
| 7,951,030 | B2* | 5/2011 | Ward | F16H 7/1218 |
| | | | | 474/112 |
| 8,613,680 | B2* | 12/2013 | Frankowski | F16H 7/1218 |
| | | | | 474/135 |
| 8,690,718 | B2* | 4/2014 | Cantatore | F16H 7/1281 |
| | | | | 474/101 |
| 8,821,328 | B2* | 9/2014 | Jud | F16H 7/1281 |
| | | | | 474/134 |
| 8,968,128 | B2 | 3/2015 | Wolf et al. | |
| 9,097,314 | B2* | 8/2015 | Wolf | F16H 7/1281 |
| 9,523,415 | B2* | 12/2016 | Schauerte | F16H 7/1281 |
| 9,625,013 | B2* | 4/2017 | Wolf | F16H 7/1281 |
| 9,976,634 | B2* | 5/2018 | Leucht | F16H 7/0831 |
| 10,520,066 | B2* | 12/2019 | Walter | F02B 67/06 |
| 2006/0068957 | A1* | 3/2006 | Stone | F16H 7/1281 |
| | | | | 474/135 |
| 2012/0028744 | A1 | 2/2012 | Hartmann et al. | |
| 2013/0040770 | A1 | 2/2013 | Wolf et al. | |
| 2014/0113755 | A1* | 4/2014 | Ward | F16H 7/12 |
| | | | | 474/112 |
| 2015/0369347 | A1 | 12/2015 | Wolf et al. | |

FOREIGN PATENT DOCUMENTS

| | | |
|---|---|---|
| DE | 102012209028 | 12/2013 |
| DE | 102013002993 | 8/2014 |
| EP | 2557295 | 2/2013 |

* cited by examiner

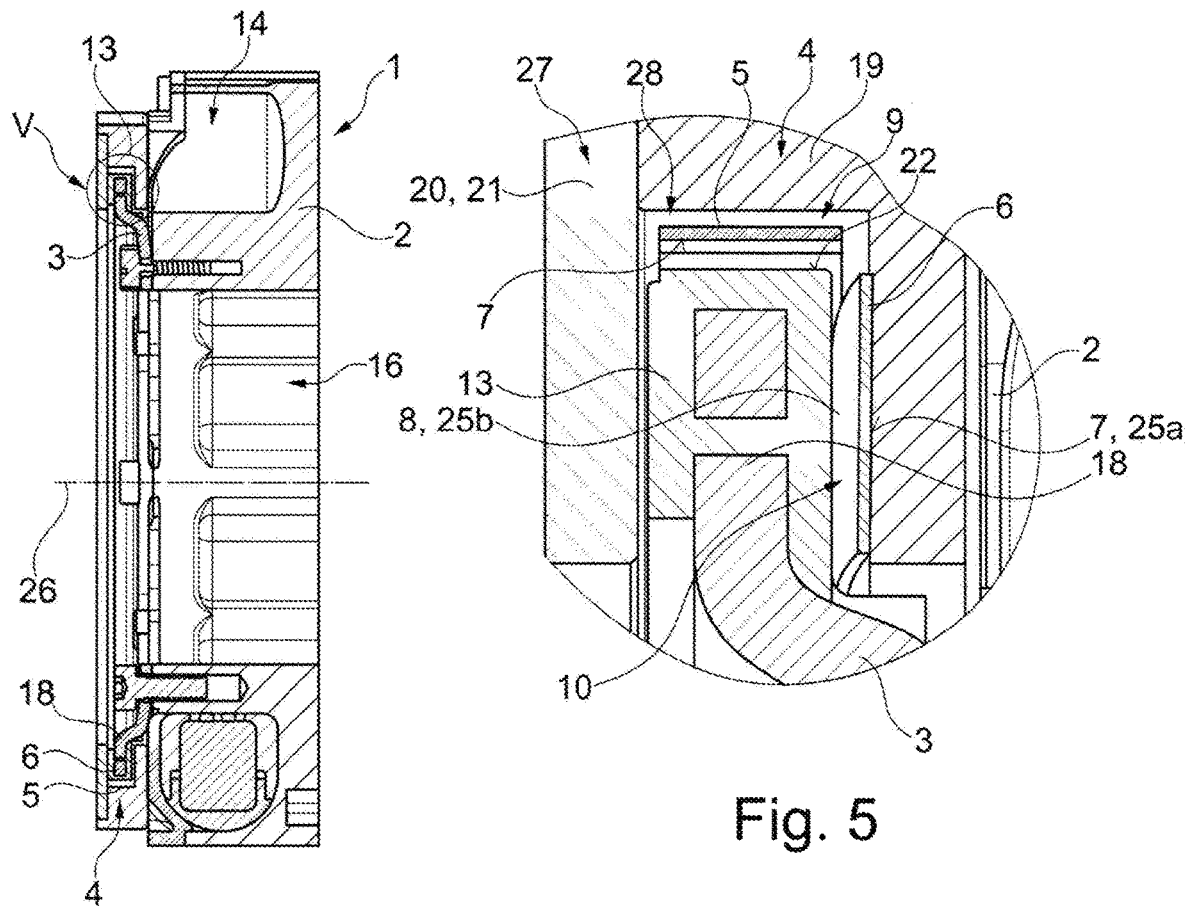
Fig. 4
Fig. 5
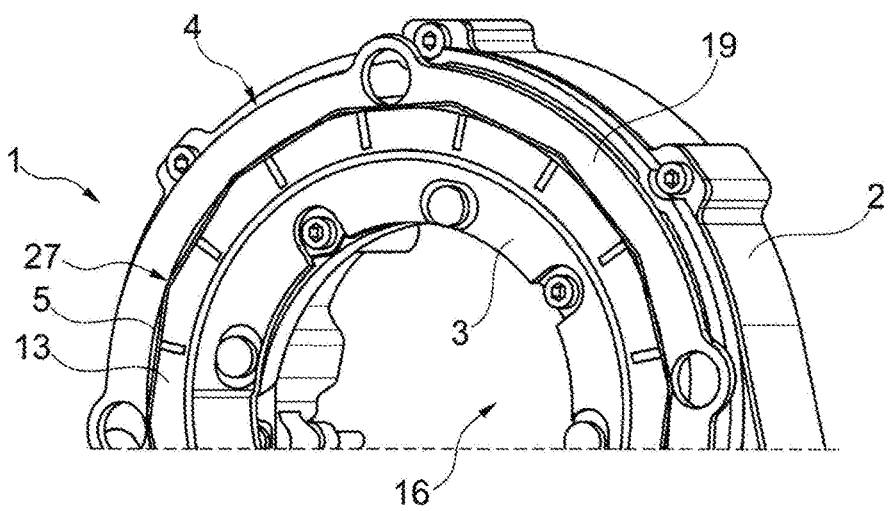
Fig. 6

CLEARANCE-FREE SELF-ALIGNING BEARING ON THE DECOUPLING TENSIONER

BACKGROUND

The invention relates to a self-aligning tensioner for an endless traction mechanism drive, preferably an endless belt drive of an internal combustion engine, such as a diesel or gasoline engine, of a motor vehicle, such as a passenger car, truck, bus, agricultural commercial vehicle, or a motorcycle, with a base unit and a separate, annular tensioner, wherein the tensioning arm is supported in a sliding bearing area of the base unit so that it can slide for allowing a rotational movement relative to the base unit.

Such self-aligning tensioners, which are also called self-aligning roller tensioners or ring tensioners, are already known in various designs from the prior art. In this context, DE 10 2011 084 680 B3 discloses, e.g., a tensioning device for a belt drive that has an endlessly revolving belt, an electric machine with a machine housing, and a drive wheel and at least one other driving wheel that is in driven connection with the drive wheel by the belt. The tensioning device comprises a tensioner housing that is supported by means of a sliding bearing so that it can pivot relative to the machine housing about the axis of the drive wheel, two tensioning rollers that load the belt with pretensioning force in its revolving direction before and behind the drive wheel, a spring means generating the pretensioning force, a tensioning arm supported so that it can move in the tensioner housing against the force of the spring means, wherein one of the tensioning rollers is supported on the tensioning arm and the other tensioning roller is supported stationary on the tensioner housing, and a bearing carrier spanning the tensioner housing in the axial direction.

Other prior art is also known from EP 2 557 295 B1 and DE 10 2012 209 028 A1.

With respect to the prior art, however, it has proven disadvantageous that often there is radial and axial clearance caused by tolerances in the sliding bearing. For each high-frequency oscillation cycle of the self-aligning tensioner, this passes through a zero point at which absolutely no radial or axial forces act on the bearing point between the tensioning arm and the base unit/sliding bearing area. This has, in turn, the consequence that at a certain oscillation excitation of the self-aligning tensioner, it enters into resonance in the bearing gap. This can result in rattling or even significantly increased wear of the sliding bearing.

SUMMARY

Therefore, the objective of the present invention is to eliminate the disadvantages known from the prior art and, in particular, to provide a self-aligning tensioner whose tensioning arm is supported without clearance as much as possible throughout all operating states.

This objective is achieved according to the invention in that, between the sliding bearing area of the base unit and the tensioning arm, there is at least one spring element tensioning the base unit and the tensioning arm against each other. This means that the sliding bearing between the tensioning arm and the base unit is pretensioned in a spring elastic way.

Therefore, it is possible to eliminate the bearing gap at least in a radial or axial direction or in both the radial and also axial direction. The self-aligning damping is set in a desired way or the natural resonance of the bearing is shifted into a frequency range that is outside of the operating frequencies. By changing the resonance behavior, rattling noises during the operation of the self-aligning tensioner are reduced significantly.

Other advantageous embodiments are claimed in the dependent claims and explained in more detail below.

Accordingly, it is also advantageous if the at least one spring element has a surface designed as an anti-friction surface. Therefore, the spring element can be integrated in an especially narrow installation space. If the anti-friction surface is here supported/contacted preferably in the radial direction and/or in the axial direction on the sliding bearing area or the tensioning arm, the spring element can be inserted in an especially targeted way. In another embodiment, the at least one spring element can also have two anti-friction surfaces that are each arranged on one of two opposing surfaces. In this way, an especially low-wear formation of the spring element is implemented.

In this context, it is also preferred when the at least one spring element applies a spring force in the radial direction (radial direction of the rotational axis of the tensioning arm) and/or in the axial direction (axial direction of the rotational axis of the tensioning arm) between the base unit and the tensioning arm. In this way, the spring element is used in a particularly effective way.

If the at least one spring element is arranged in a radial gap and/or in an axial gap between the sliding bearing area and the tensioning arm, it can be used in many different ways without great changes to the existing self-aligning tensioner design.

In addition, it is advantageous if a first spring element is arranged in a radial gap between the sliding bearing area and the tensioning arm and a second spring element is arranged in an axial gap between the sliding bearing area and the tensioning arm. In this way, at least two spring elements are inserted in the self-aligning tensioner, which support the tensioning arm in a stable manner in the respective direction relative to the sliding bearing area. In this way, an especially effective reduction of the bearing clearance is implemented both in the radial direction and also in the axial direction.

For the use of the self-aligning tensioner it has proven to produce an especially long service life if the at least one spring element is constructed as a corrugated spring.

It is also preferable if the at least one spring element has a ring-shaped or disk-shaped construction, wherein it can be used in a radial or axial gap between the sliding bearing area and the tensioning arm in a space-saving manner.

In this context, it is also advantageous if the corrugated spring has an annular construction, wherein its (inner and outer) diameters change in an undulating manner in the circumferential direction. If the corrugated spring has a disk-shaped construction, it is advantageous if its axial side walls run in the circumferential direction in an undulating manner (curved). In this way, the at least one spring element is produced in a compact and economical way.

It is further advantageous if the at least one spring element is connected by a rotational locking to the sliding bearing area or the tensioning arm. In this way it is possible that only one surface of the at least one spring element is constructed in a desired way as an anti-friction surface, whereby the production costs are further reduced.

In particular, in this context it is advantageous if the at least one spring element is fixed/held rotationally locked by a positive-fit connection (in the rotational direction of the tensioner arm relative to the base unit) on the sliding bearing area or the tensioning arm. Then the rotational locking is easy to produce.

It is further advantageous if the at least one spring element is supported/contacted on an anti-friction lining of the tensioning arm. In this way, the wear of the sliding bearing area can be further reduced.

BRIEF DESCRIPTION OF THE DRAWINGS

The invention is now explained in more detail with reference to figures in which context various embodiments will also be described.

Shown are.

DETAILED DESCRIPTION

The figures have a merely schematic nature and are used only for understanding the invention. The same elements are provided with the same reference symbols.

Figure 1:
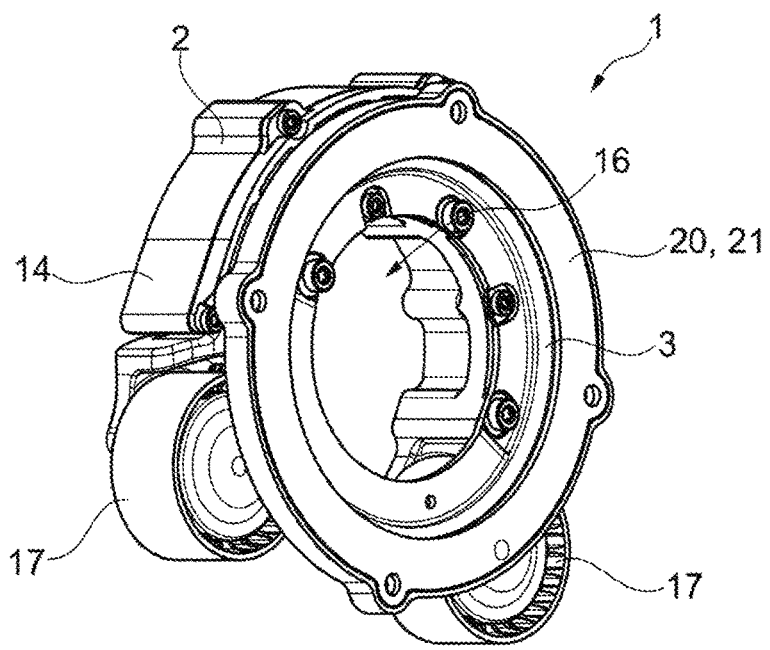
FIG. 1 a perspective view of a self-aligning tensioner according to the invention in accordance with a preferred embodiment, wherein the self-aligning tensioner is shown from one side on which the tensioning arm is to be seen on the end side, FIG. 2 a perspective representation of the self-aligning tensioner according to FIG. 1 shown partially sectioned in the longitudinal direction, wherein the sliding bearing location is to be seen between a sliding bearing area of the base unit of the self-aligning tensioner and the tensioning arm, FIG. 3 a detailed view of the area shown in FIG. 2 with "III," in which the spring elements inserted in an axial gap and a radial gap between the base unit and the tensioning arm can be seen, FIG. 4 a longitudinal section representation of the self-aligning tensioner according to the invention in accordance with FIG. 1, FIG. 5 a detailed representation of the area shown in FIG. 4 with "V" in which the two spring elements can be clearly seen how they are inserted between the sliding bearing area and the tensioning arm, FIG. 6 a perspective representation of a part of the self-aligning tensioner according to FIG. 1, wherein the arrangement of the first spring element can be seen how it is inserted in a radial gap between the tensioning arm and the base section/sliding bearing area of the base unit, FIG. 7 a perspective representation of a circumferential area of the self-aligning tensioner according to FIG. 1, in a sliding bearing area of the base unit, wherein the representation of the tensioning arm is omitted, so that the two spring elements in the form of corrugated springs can be seen especially well, FIG. 8 again a perspective representation of the circumferential area of the self-aligning tensioner similar to FIG. 7, wherein the circumferential area is now shown at a different angle, so that in particular, the corrugated extension of the second spring element used as an axial spring in an axial gap can be seen, FIG. 9 in turn, a perspective representation of the self-aligning tensioner according to FIG. 1, wherein the rotational lock relative to the base unit for the first spring element arranged in a radial gap can be seen, FIG. 10 a perspective representation of the first spring element how it is inserted in the self-aligning tensioner according to FIG. 1, and FIG. 11 a perspective representation of the second spring element how it is inserted in the self-aligning tensioner according to FIG. 1.
Figure 2:
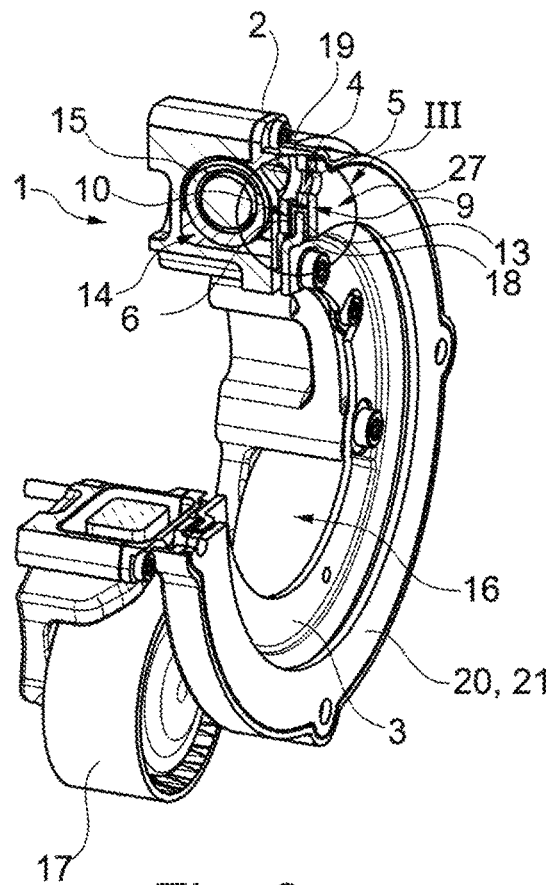
Figure 3:
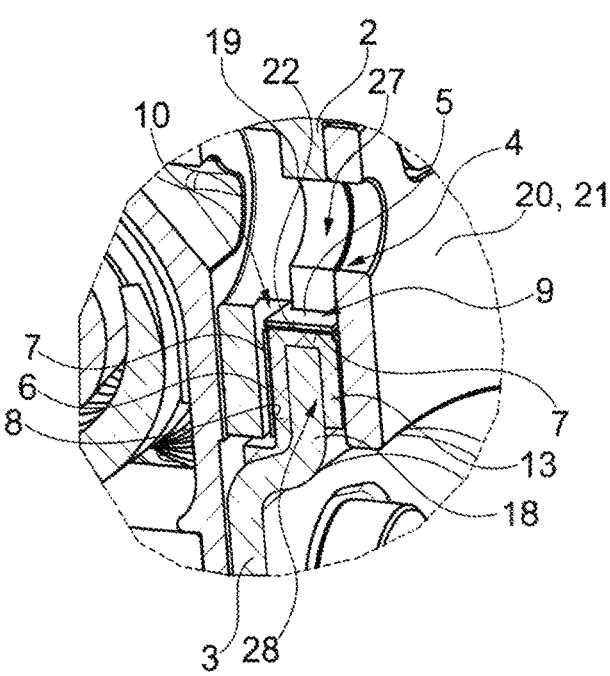

In FIG. 1, a self-aligning tensioner 1 according to the invention is shown in accordance with a preferred embodiment. The self-aligning tensioner 1 is here constructed as a self-aligning belt tensioner and is consequently used during operation for pretensioning an endless traction mechanism formed as a belt in an endless traction mechanism drive/belt drive. The endless traction mechanism drive, which is not shown in more detail here for the sake of clarity, connects an output shaft/crankshaft of the internal combustion engine to another rotating part, for example, a drive shaft of an auxiliary unit, such as an alternator, during the operation of an internal combustion engine.

The self-aligning tensioner 1 is constructed and acts as a ring tensioner. Accordingly, the self-aligning tensioner 1 has an annular base unit 2 that is arranged during operation typically fixed on an alternator housing. The base unit 2 has, like also an annular tensioning arm 3 that can rotate relative to it, a central opening 16 in the form of a through hole. In this way, the self-aligning tensioner 1 can be pushed onto the alternator housing during operation.

The base unit 2 has a receptacle space 14 that houses at least one bow spring, namely multiple bow springs 15 running in the circumferential direction of the self-aligning tensioner 1 (with respect to a rotational axis 26 of the tensioning arm 3). The bow springs 15 are supported/inserted in the circumferential direction between a section of the base unit 2 and a section of the tensioning arm 3 supported so that it can rotate about the rotational axis 26 relative to the base unit 2. Both on the base unit 2 and also on the tensioning arm 3 there is a tensioning roller 17 supported so that it can rotate, wherein this tensioning roller 17 is in contact with the endless traction mechanism in the form of a belt during operation and is pressed onto the endless traction mechanism due to the spring force of the bow springs 15 by a pretensioning force.

As can be seen in connection with FIGS. 2 to 5, for supporting the tensioning arm 3 relative to the base unit 2, a sliding bearing 27 is provided on the self-aligning tensioner 1. On the base unit 2 there is a sliding bearing area 4 of the sliding bearing 27 for supporting the tensioning arm 3. Together with a radially outside/radially outer flange area 18 of the tensioning arm 3, the sliding bearing area 4 forms the sliding bearing 27. The flange area 18 has an anti-friction lining 13 preferably consisting of plastic, wherein the anti-friction lining can be seen especially well in FIGS. 3 and 5. The sliding bearing area 4 is formed essentially by a groove-shaped, circumferential bearing space 28 of the base unit 2.

The sliding bearing area 4 of the base unit 2 is connected to the receptacle space 14. A first support area 19 of the sliding bearing area 4 that extends radially inward adjacent to a first axial side of the tensioning arm 3, as well as a second support area 20 in the form of a cover 21 that extends radially inward adjacent to a second axial side of the tensioning arm 3 directed opposite the first side together form the bearing space 28. The cover 21 is fixed, in turn, on the first support area 19 so that it is removable. In the axial direction between the two support areas 19, 20, the flange area 18 is arranged together with the anti-friction lining 13. The tensioning arm 3 is also surrounded by the first support area 19 radially from the outside. Thus, the base unit 2 forms a sliding bearing area 4 that has essentially a groove shape/U shape viewed in cross section and is open radially inward and forms the bearing space 28 for the flange area 18 that projects on its radially outer area with the anti-friction lining 13.

Figure 10:
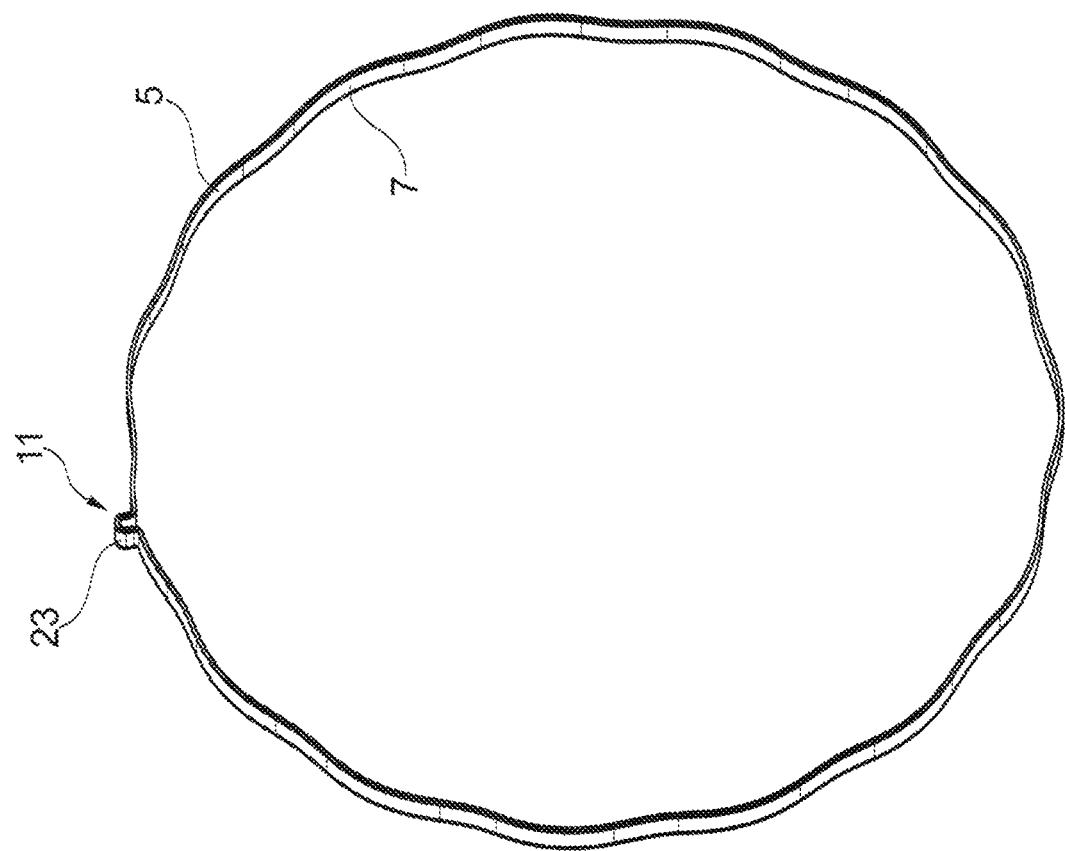

As can also be seen in FIGS. 4 and 5, in the radial direction between a radial outer side 22 of the anti-friction lining 13/tensioning arm 3 and the first support area 19/sliding bearing area 4, a radial gap 9 is formed. In this radial gap 9, according to the invention a first spring element 5 is inserted tensioned/pretensioned in the radial direction of the tensioning arm 3. This first spring element 5 can also be seen especially well in its entirety in connection with FIGS. 6 to 9 and also by itself in FIG. 10.

The first spring element 5 has an annular construction (FIG. 10) and extends along the circumference/in the circumferential direction of the self-aligning tensioner 1 in an undulating manner. The first spring element 5 is thus formed as a corrugated spring. An inner diameter and an outer diameter of the first spring element 5 (based on constant sheet thickness) change in an undulating manner (expands and then contracts again) in the circumferential direction of the self-aligning tensioner 1. Through this use of the first spring element 5, the sliding bearing 27 is spring-tensioned, namely in the radial direction. The first spring element 5 is therefore under radial pretensioning, i.e., under application of a radial pretensioning force/radial spring force, in the radial gap 9 under all operating states. A radial gap between the tensioning arm 3 and the base unit 2 is thus eliminated. The tensioning arm 3 is always oriented in the radial direction relative to the base unit 2.

The first spring element 6 also has rotational locking 11. This rotational locking is implemented by a bulge 23 in the radial direction. The bulge 23 is inserted in a positive-fit connection in a recess 24 with a complementary construction (FIG. 9) in the sliding bearing area 4, namely in the first support area 19. In this way, a positive-fit connection 12 is realized, by which the first spring element 5 is held/supported locked in rotation relative to the base unit 2. With its outer circumferential side, the first annular spring element 5 thus forms a rotationally locked contact on an inner circumferential side of the first support area 19. In contrast, with its inner circumferential side, the first spring element 5 is formed as an anti-friction surface, called first anti-friction surface 7 below. The first anti-friction surface 7 forms a surface of the first spring element 5 that is optimized in terms of material and also geometry with respect to the sliding bearing of the tensioning arm 2/anti-friction lining 13. The tensioning arm 3 can be moved along the first anti-friction surface 7 (by rotation) during operation, as can be seen, e.g., in FIG. 5.

In addition, in the axial direction between the first support area 19 and the tensioning arm 3, namely toward the first axial side of the tensioning arm 3, an axial gap 10 is formed. A spring element, namely a second spring element 6, is also inserted in this axial gap 10.

Figure 7:
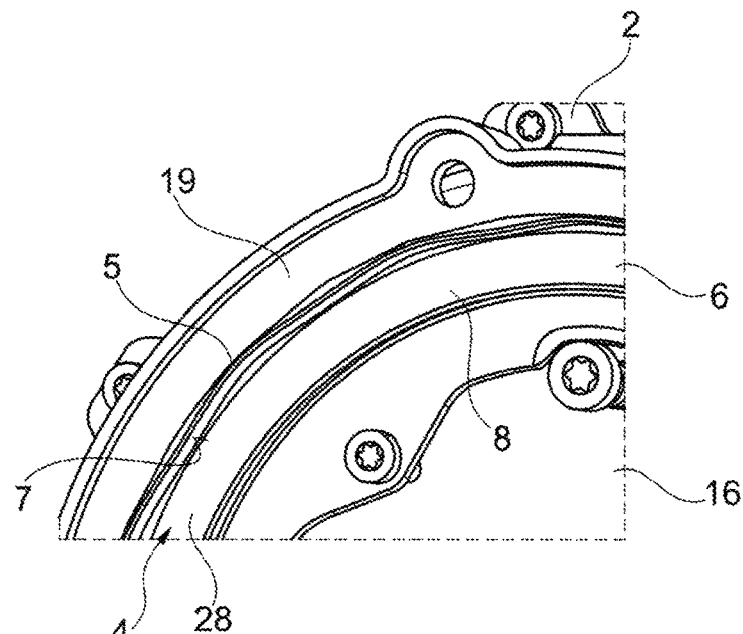
Figure 8:
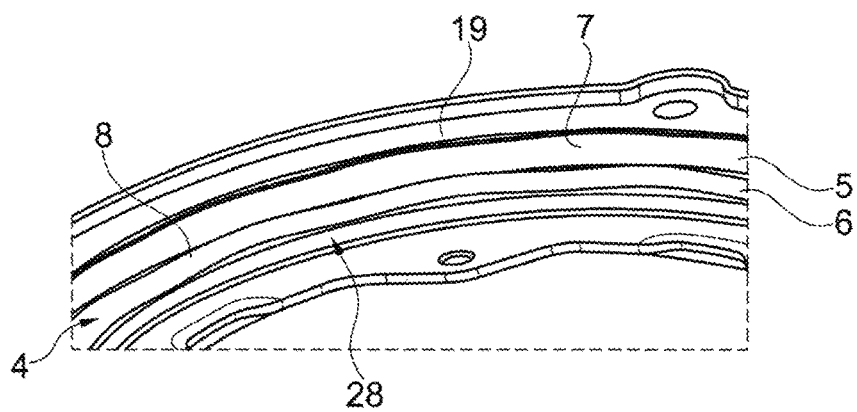
Figure 9:
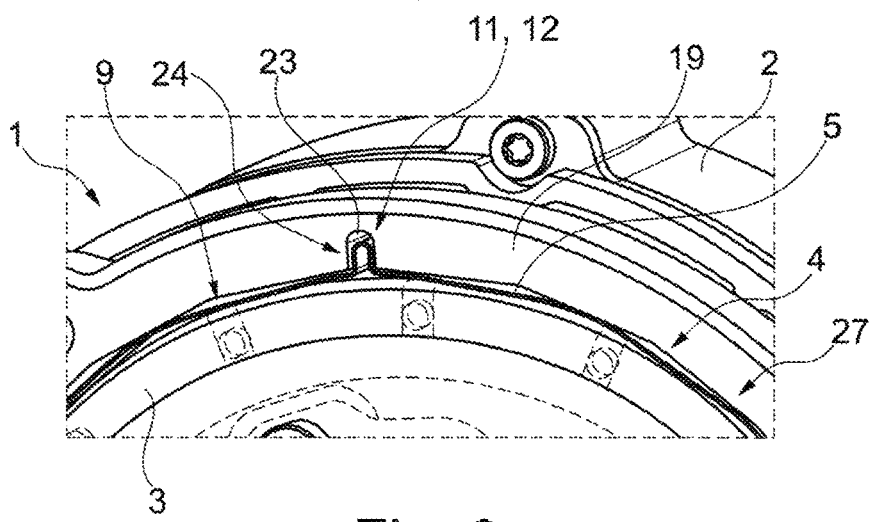
Figure 11:
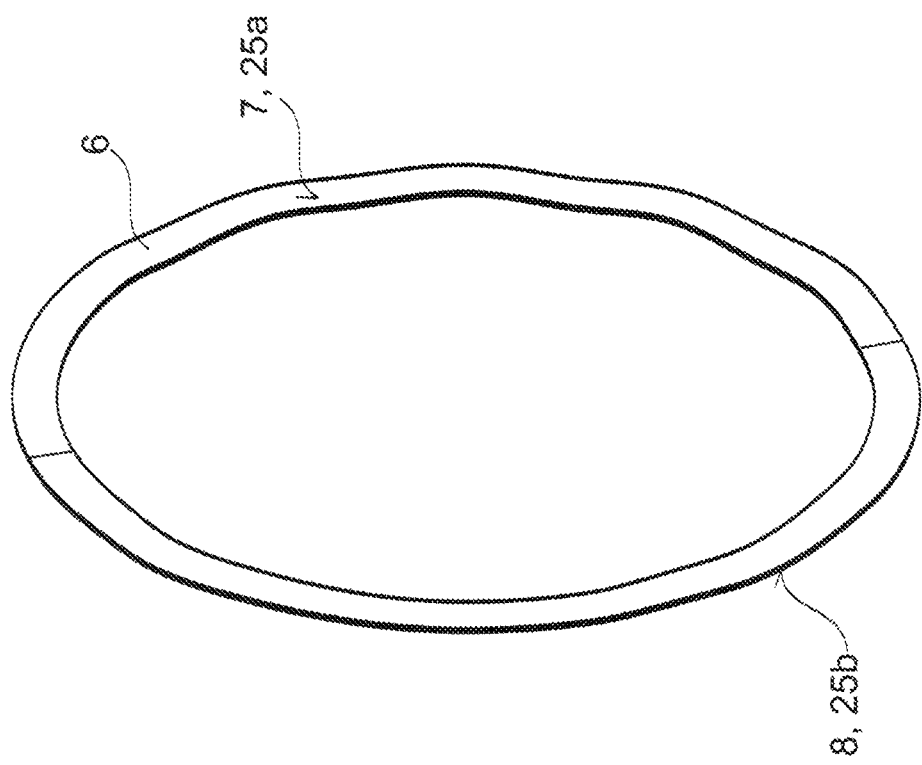

The construction of the second spring element 6 can be seen, in turn, in FIGS. 7 and 8, and also separately in FIG. 11. The second spring element 6 has a disk-shaped construction with central through hole/annular disk construction. The second spring element 6 is also constructed like the first spring element 5 as a corrugated spring. The second spring element 6, however, is formed so that its axial side walls 25a, 25b/end surfaces run in an undulating manner in the circumferential direction. Also, like the first spring element 5, the second spring element 6 is produced from a spring sheet made from metal and is constant in its sheet thickness viewed along the circumference. Both a first side wall 25a oriented toward the first axial side and also a second side wall 25b oriented toward the second axial side are constructed as first and second anti-friction surfaces 7, 8, respectively. It is also possible to arrange the second spring element 6, in turn, rotationally locked on the base unit 2 (or the tensioning arm 3). In this case, then, in turn, only a second side wall 25b preferably turned toward the tensioning arm 3 is constructed as a (second) anti-friction surface 8.

The second spring element 6 is under axial pretensioning, i.e., under application of an axial pretensioning force/axial spring force, in the axial gap 10. The second spring element 6 applies such a spring force on the sliding bearing area 4 and on the tensioning arm 3 such that the tensioning arm 3 is held without clearance in the axial direction relative to the sliding bearing area 4. Through this construction, a clearance-free holding of the tensioning arm 3 implemented both in the axial direction and also in the radial direction is realized.

In other words, according to the present invention, to retain radial clearance from the bearing (sliding bearing 27), additional clearance is provided and a circumferential corrugated spring (first spring element 5) under a certain amount of pretensioning is used in this installation space. In this way it is guaranteed that the tensioner 1 cannot move freely in the radial direction in the bearing 27. According to the same principle, an axial corrugated spring (second spring element 6) is also used, which eliminates the clearance in the axial direction. This spring 6 is also under a slight pretensioning force. The spring stiffness values are designed so that their natural frequencies are above the operating frequencies of the self-aligning tensioner 1 and resonant vibrations do not develop. The springs 5, 6 also provide the advantage to be able to set the self-aligning damping in a targeted way as a function of the selected pretensioning force.

LIST OF REFERENCE SYMBOLS

1 Self-aligning tensioner
2 Main unit
3 Tensioning arm
4 Sliding bearing area
5 First spring element
6 Second spring element
7 First anti-friction surface
8 Second anti-friction surface
9 Radial gap
10 Axial gap
11 Rotational locking
12 Positive-fit connection
13 Anti-friction lining
14 Receptacle
15 Bow spring
16 Opening
17 Tensioning roller
18 Flange area
19 First support area
20 Second support area
21 Cover
22 Outside
23 Bulge
24 Recess
25a First side wall
25b Second side wall
26 Rotational axis
27 Sliding bearing
28 Bearing chamber

The invention claimed is:

1. A self-aligning tensioner for an endless traction mechanism drive of an internal combustion engine, the self-aligning tensioner comprising:
  a base unit, and
  a separate, annular tensioning arm, the base unit including a sliding bearing area in which the tensioning arm is supported for rotational movement relative to the base unit, and at least one spring element located between the sliding bearing area of the base unit and the tensioning arm that tensions the base unit and the tensioning arm against each other, and the at least one spring element is arranged in both a radial gap and an axial gap between the sliding bearing area and the tensioning arm.

2. The self-aligning tensioner according to claim 1, wherein the at least one spring element has a surface that is an anti-friction surface.

3. The self-aligning tensioner according to claim 1, wherein the at least one spring element applies a spring force in at least one of a radial direction or an axial direction between the base unit and the tensioning arm.

4. The self-aligning tensioner according to claim 1, wherein the at least one spring element comprises a first spring element that is arranged in the radial gap between the sliding bearing area and the tensioning arm and a second spring element that is arranged in the axial gap between the sliding bearing area and the tensioning arm.

5. The self-aligning tensioner according to claim 1, wherein the at least one spring element is a corrugated spring.

6. The self-aligning tensioner according to claim 1, wherein the at least one spring element is annular or disk-shaped.

7. The self-aligning tensioner according to claim 1, wherein the at least one spring element is connected by a rotational lock to the sliding bearing area or the tensioning arm.

8. The self-aligning tensioner according to claim 1, wherein the at least one spring element is rotationally locked by a positive-fit connection on the sliding bearing area or the tensioning arm.

9. The self-aligning tensioner according to claim 1, wherein the at least one spring element is supported on an anti-friction lining of the tensioning arm.

10. A self-aligning tensioner for an endless traction mechanism drive, the self-aligning tensioner comprising:

a tensioning arm, a base unit including a sliding bearing area in which the tensioning arm is supported for rotational movement about an axis relative to the base unit, and at least one spring element located between the sliding bearing area of the base unit and the tensioning arm that tensions the base unit and the tensioning arm against each other, wherein the at least one spring element comprises a first spring element that is arranged in a radial gap between the sliding bearing area and the tensioning arm and a second spring element that is arranged in an axial gap between the sliding bearing area and the tensioning arm.

11. The self-aligning tensioner of claim 10, wherein the tensioning arm is annular and is received in an annular channel defined in the base unit in which the sliding bearing area is located.

12. The self-aligning tensioner of claim 10, wherein the at least one spring element has a surface that is an anti-friction surface that contacts at least one of the base unit or the tensioning arm.

13. The self-aligning tensioner of claim 10, wherein the at least one spring element is arranged in at least one of a radial gap or an axial gap between the sliding bearing area and the tensioning arm.

14. The self-aligning tensioner of claim 10, wherein the first and second spring elements are corrugated springs.

15. The self-aligning tensioner of claim 14, wherein the corrugated springs are formed of flat sheet metal having a constant thickness.

16. The self-aligning tensioner of claim 10, wherein the at least one spring element is rotationally locked by a positive-fit connection on the base unit or the tensioning arm.

\* \* \* \* \*